(12) United States Patent
Winekoff et al.

(10) Patent No.: US 11,252,939 B2
(45) Date of Patent: Feb. 22, 2022

(54) MULTI-APERTURE PLATE FASTENING

(71) Applicant: PetSmart Home Office, Inc., Phoenix, AZ (US)

(72) Inventors: Kirby Winekoff, Phoenix, AZ (US); Bin Cai, Taizhou (CN)

(73) Assignee: PETSMART HOME OFFICE, INC., Phoenix, AZ (US)

( * ) Notice: Subject to any disclaimer, the term of this patent is extended or adjusted under 35 U.S.C. 154(b) by 0 days.

(21) Appl. No.: 16/098,386

(22) PCT Filed: Nov. 8, 2017

(86) PCT No.: PCT/CN2017/109912
§ 371 (c)(1),
(2) Date: Nov. 1, 2018

(87) PCT Pub. No.: WO2019/090508
PCT Pub. Date: May 16, 2019

(65) Prior Publication Data
US 2021/0227792 A1    Jul. 29, 2021

(51) Int. Cl.
*A01K 15/04*    (2006.01)
*A44B 13/00*    (2006.01)
*A01K 13/00*    (2006.01)

(52) U.S. Cl.
CPC ............ *A01K 15/04* (2013.01); *A01K 13/006* (2013.01); *A44B 13/00* (2013.01)

(58) Field of Classification Search
CPC ....... A01K 15/04; A01K 27/001; A44B 13/00
See application file for complete search history.

(56) References Cited

U.S. PATENT DOCUMENTS

| | | | | | |
|---|---|---|---|---|---|
| 1,817,775 | A | * | 8/1931 | Sipe | F16B 7/04 403/361 |
| 3,036,554 | A | * | 5/1962 | Johnson | A01K 13/006 119/821 |
| 3,123,389 | A | * | 3/1964 | Biesecker | F16B 5/10 292/218 |
| 3,810,279 | A | * | 5/1974 | Swick | F16B 21/084 411/509 |
| 3,893,208 | A | * | 7/1975 | Yuda | F16B 5/065 411/508 |
| 4,524,494 | A | * | 6/1985 | Sato | F16B 21/082 174/138 D |
| 4,762,437 | A | * | 8/1988 | Mitomi | F16B 21/02 24/297 |

(Continued)

FOREIGN PATENT DOCUMENTS

| | | |
|---|---|---|
| CN | 2152389 Y | 1/1994 |
| CN | 102630598 A | 8/2012 |

(Continued)

*Primary Examiner* — Joshua D Huson
*Assistant Examiner* — Caleb Kelsey Hrubes
(74) *Attorney, Agent, or Firm* — Duane Morris LLP

(57) ABSTRACT

Disclosed are an arced plate, a first fastener, and a second fastener. The arced plate can define a first arced aperture array and a second arced aperture array. When the arced plate, the first fastener, and the second fastener are used in combination, the fasteners can retain the arced plate as a truncated cone. Each fastener can include inserts configured to extend through, and thereby occupy minor apertures formed in the arced plate.

21 Claims, 5 Drawing Sheets

(56) References Cited

U.S. PATENT DOCUMENTS

| | | | |
|---|---|---|---|
| 4,936,066 A | | 6/1990 | Rutsche et al. |
| 5,039,267 A | * | 8/1991 | Wollar .................... F16B 21/08 411/508 |
| 5,306,098 A | * | 4/1994 | Lewis .................... F16B 19/004 411/510 |
| 5,349,927 A | * | 9/1994 | Campbell ............ A01K 13/006 119/815 |
| 5,868,537 A | * | 2/1999 | Latal .................... F16B 21/084 411/418 |
| 6,237,970 B1 | * | 5/2001 | Joannou ................ E05B 65/006 292/241 |
| 6,248,956 B1 | * | 6/2001 | Cook .................... H01B 17/00 174/155 |
| 6,612,795 B2 | * | 9/2003 | Kirchen ................. F16B 21/02 24/297 |
| 6,752,576 B2 | * | 6/2004 | Johansson ........... F16B 13/0833 411/21 |
| D506,296 S | * | 6/2005 | Driver .......................... 119/815 |
| D562,505 S | * | 2/2008 | Fujita ................... H01B 17/00 D30/152 |
| 7,503,528 B2 | * | 3/2009 | Adams ................. F16B 5/0685 24/297 |
| 2003/0150401 A1 | | 8/2003 | Schmid et al. |

FOREIGN PATENT DOCUMENTS

| | | |
|---|---|---|
| CN | 202958428 U | 6/2013 |
| CN | 205143169 U | 4/2016 |
| CN | 205455295 U | 8/2016 |
| DE | 202005020043 U1 | 3/2006 |
| JP | 2002320424 A | 1/2002 |
| KR | 20090012557 U | 12/2009 |

\* cited by examiner

MULTI-APERTURE PLATE FASTENING

PRIORITY CLAIM

The present application is a U.S. national stage entry under 35 U.S.C. § 371 of International App. No. PCT/CN2017/109912 to K. Winekoff, which was filed on 8 Nov. 2017 and is hereby incorporated by reference.

BACKGROUND

Field of the Disclosure

This disclosure relates to fasteners and plates. The plates can be animal collars.

Description of Related Art

Elizabethan collars are typically configured to be wrapped into a truncated cone. The cone is positioned about an animal's neck and head. The cone prevents the animal from licking or disturbing veterinary stitching. The collars are typically biased to a flat (i.e., unwrapped) state.

SUMMARY

A plate-fastener assembly can include an arced plate, a first fastener, and a second fastener. The arced plate can include an inner surface and an outer surface. The arced plate can define a first arced aperture array, a second arced aperture array, a first fastener hole, and a second fastener hole. The first arced aperture array can include a plurality of first minor apertures and a plurality of first major apertures. The second arced aperture array can include a plurality of second minor apertures and a plurality of second major apertures.

Each of the fasteners can include a tab, a plurality of transverse plates defining a annular slot, a transverse catch, and two inserts extending normal to the transverse catch. The first fastener can be disposed in the first fastener hole such that the arced plate occupies the first fastener annular slot and thereby retains the first fastener. The second fastener can be disposed in the second fastener hole such that the arced plate occupies the second fastener annular slot and thereby retains the second fastener.

A plate-fastener assembly can include: (a) a first plate defining a first aperture array and a second aperture array, (b) a second plate defining a first fastener hole and a second fastener hole, and (c) a first fastener and a second fastener. The first and second fasteners can bind the first plate and the second plate together.

The first arced aperture array can include a plurality of first minor apertures and a plurality of first major apertures. The second arced aperture array can include a plurality of second minor apertures and a plurality of second major apertures. Each of the fasteners can include a tab, a plurality of transverse plates defining an annular slot, a transverse catch, and two inserts extending normal to the transverse catch.

The first fastener can be disposed in the first fastener hole such that the second plate occupies the first fastener annular slot and thereby retains the first fastener. The second fastener can be disposed in the second fastener hole such that the second plate occupies the second fastener annular slot and thereby retains the second fastener.

BRIEF DESCRIPTION OF DRAWINGS

For clarity and ease of reading, some Figures omit views of certain features. According to some examples, the Figures are not drawn to scale. According to other examples, the Figures are drawn to scale.

DETAILED DESCRIPTION

Figure 1:
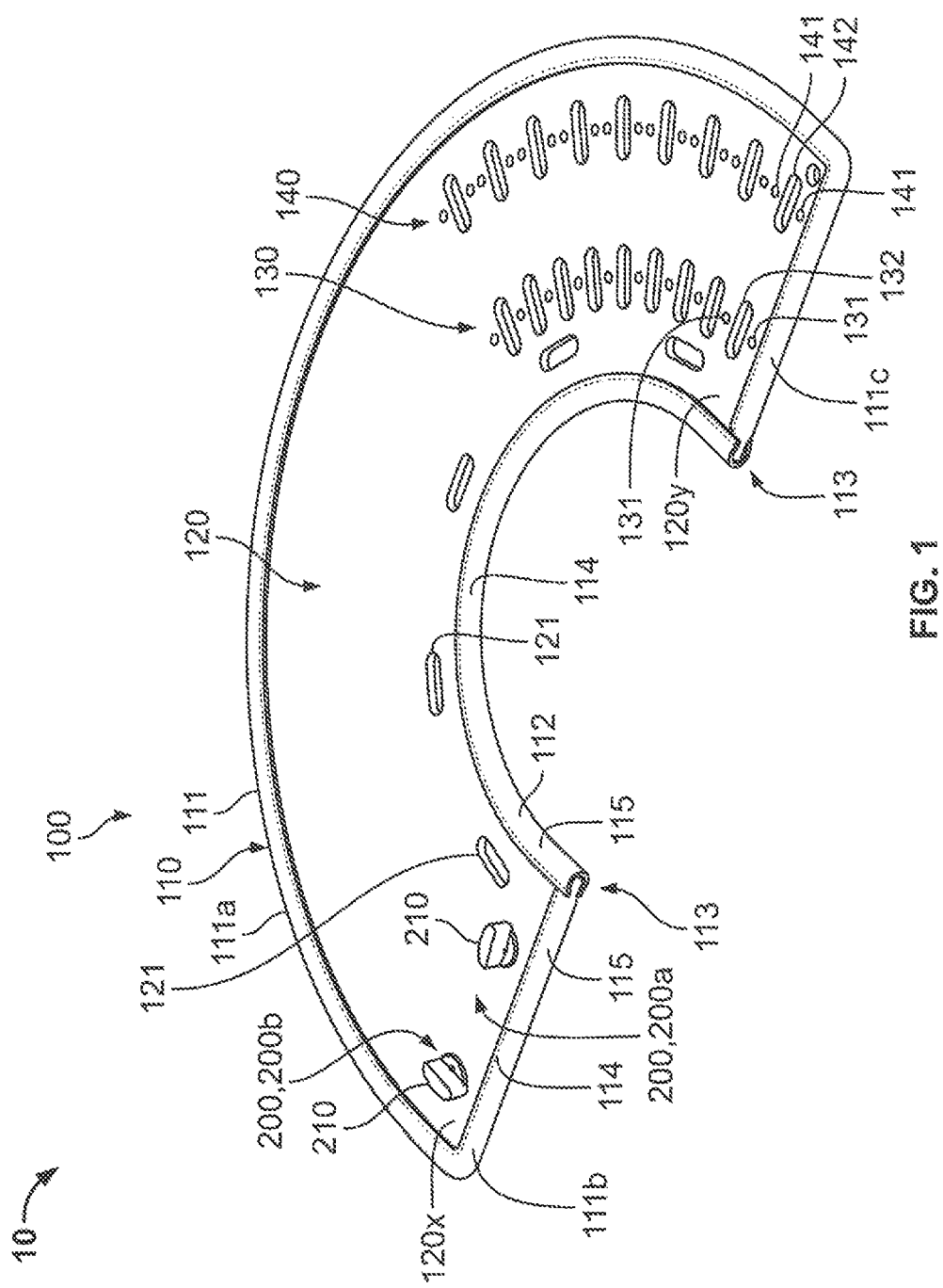
FIG. 1 is a top isometric view of an example plate-fastener assembly.

The assemblies, products, and features disclosed herein can be embodied in various forms. Some exemplary and non-limiting examples are shown in the drawings and are discussed below. Features of the disclosed examples are optional. Some implementations can include more, different, or fewer features.

The subject matter is described with illustrative examples. The claimed inventions are not limited to these examples. Changes and modifications can be made to the claimed inventions without departing from their spirit. It is intended that the claims cover such changes and modifications. The term approximately, substantially, or generally encompasses ±10%.

Figure 2:
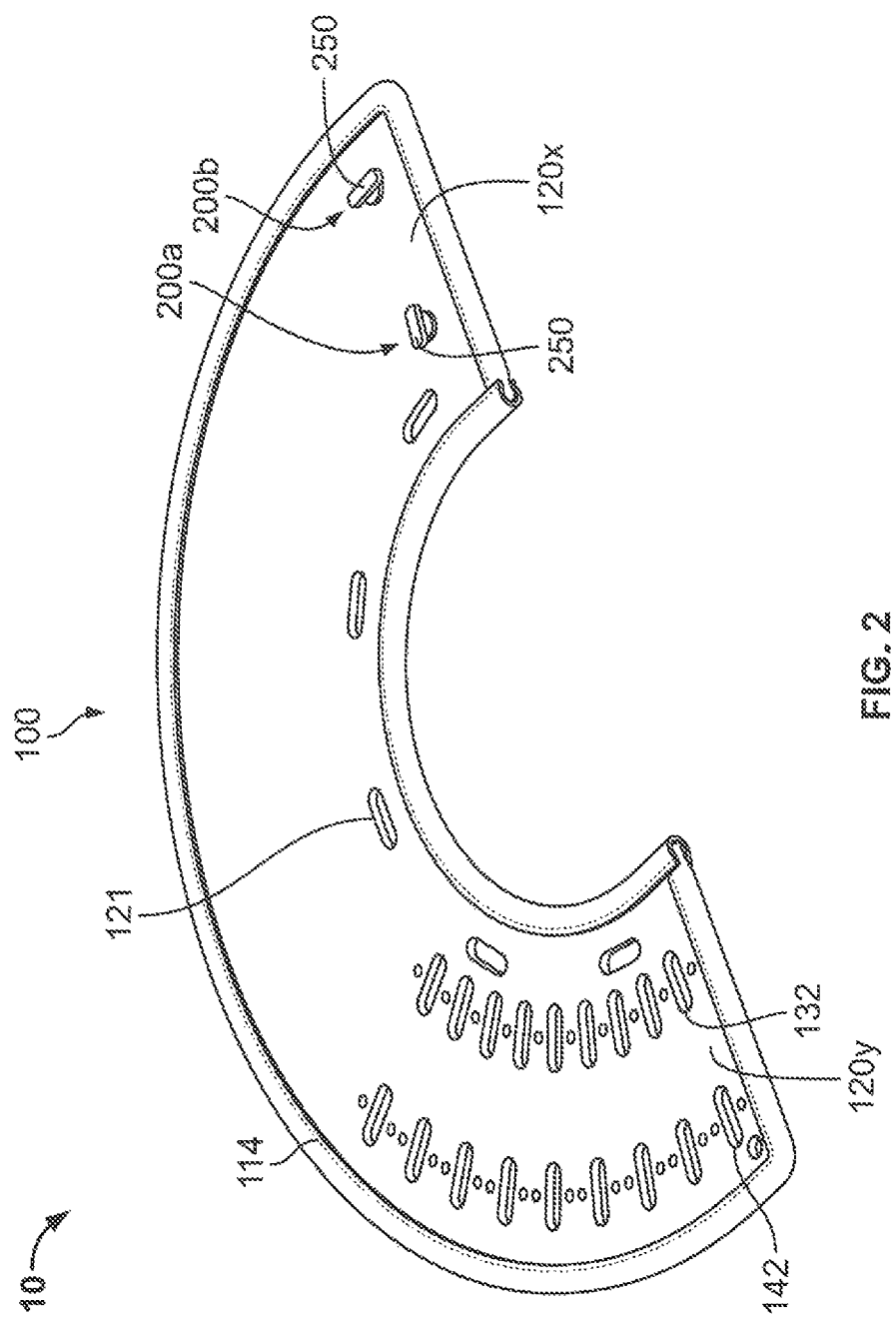
FIG. 2 is a bottom isometric view of the example plate-fastener assembly.
Figure 3:
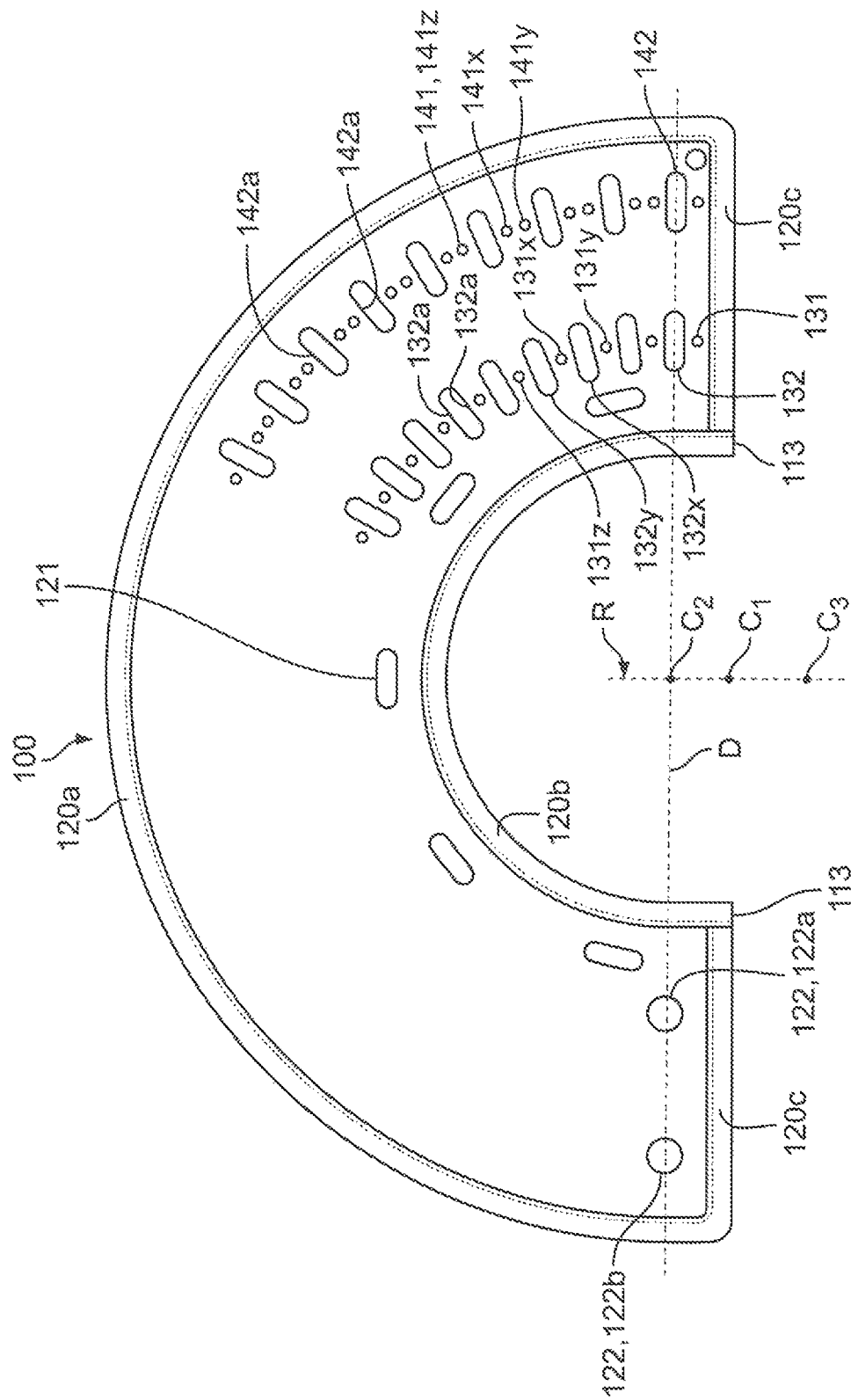
FIG. 3 is a top plan view of an example plate assembly for the example plate-fastener assembly.

FIGS. 1-3 show a plate-fastener assembly 10 (also called an assembly) including a plate assembly 100 and two fastener 200. Plate assembly 100 can include an outer cushion 110 and an arced plate 120 (also called a plate). Fasteners 200 can be moveably retained in fastener holes 122 (see FIG. 3) defined in arced plate 120.

Plate assembly 100 can be flexible and configured to fold (e.g., wrap) into a three dimensional truncated cone (not shown). A user can wrap the truncated cone about an animal's head to discourage the animal from disturbing veterinary stitches. Wrapping can involve overlapping opposing ends 120x, 120y of arced plate 120.

After wrapping, the user can lock outer fastener 200b into an outer arced aperture array 140 and lock inner fastener 200a into an inner arced aperture array 130 to discourage plate assembly 100 from springing back into the flat (e.g., generally flat) state shown in FIG. 1. Thus, fasteners 200 can link the opposing ends 120x, 120y together. Examples of plate assembly 100 configured to fold/wrap into the truncated cone format are colloquially known as an "Elizabethan cone."

Perimeter cushion 110 can be made of two discrete strips 111, 112 joined at corners 113. Perimeter cushion 110 can be stitched to arced plate 120 via seams 114. Perimeter cushion 110 offers an ornamental and aesthetically pleasing effect by highlighting the boundary between arced plate 120 and ambient. To enhance this aesthetic effect, and as shown in FIG. 1, the exterior surface 115 of perimeter cushion 110 can be arced (e.g., rounded).

When wrapped into the truncated cone, arced inner strip 112 can define a minimum circumference of the truncated cone (e.g., the very bottom of the cone, which circumscribe the animal's neck) while the arced portion 111a of outer strip 111 can define a maximum circumference of the truncated cone (e.g., the very top of the cone, which can be coplanar with the animal's head (e.g., form a plane that intersects at least a portion of the animal's head)). The side segments 111b, 111c of strip 111 can be parallel (e.g., collinear). When in truncated cone form, one side segment 111b or 111c can be disposed radially inside the truncated cone while the other side segment 111c or 111b can be disposed radially exterior the truncated cone.

For aesthetic effect, and as shown in FIG. 1, arced plate 120 can be made from a transparent and/or light-reflective plastic. To accommodate wrapping and unwrapping, the plastic can be flexible. Arced plate 120 can have: (a) an outer edge 120a, disposed within arced outer strip portion 111a, (b) an inner edge 120b, disposed within arced inner strip portion 112, and (c) two radial edges 120c disposed within side segments 111b, 111c. As shown in FIG. 3, cushion 110 can cover edges 120a, 120b, 120c. Arced plate 120 can have a constant thickness and thus both inner edge 120a and outer edge 120b can be flat and narrow surfaces.

One or both of the outer and inner edges 120a, 120b can be semi-circular (e.g., perfectly semi-circular, generally semi-circular) about a reference center C defined equidistant from corners 113. Such an arrangement is visually pleasing.

Reference center C can be collinear with corners 113 (indicated as $C_1$). Reference center C can be disposed at any location on a reference line R (e.g., $C_2$ or $C_3$). As used herein, semi-circular can mean half of a circle or an incomplete portion of a circle (e.g., 40% of a circle).

According to some examples, reference center C (indicated as $C_2$) can be collinear with fastener holes 122, a major axis of a first major aperture 132, and a major axis of a second major aperture 142. In this case, reference segment D can partition a perfectly semi-circular portion of plate assembly (disposed above segment D in FIG. 3) from a rectangular portion of plate assembly (disposed below segment D in FIG. 3). According to this example, plate assembly 100, including arced plate 120, is still considered to be semi-circular since the vast majority of plate assembly 100 is circularly arced.

Arced plate 120 can define a plurality of holes and apertures. According to some examples, the terms "holes" and "apertures" are used interchangeably. Arced plate 120 can define (a) a plurality of circumferentially spaced oval shaped holes 121, (b) a plurality of fastener holes 122, (c) an inner arced aperture array 130, and (d) an outer arced aperture array 140. The circumferential spacing of oval shaped holes 121 and the arcs of the first and second aperture arrays 130, 140 generate a visually pleasing effect.

Fastener holes 122 can include an inner fastener hole 122a and an outer fastener hole 122b. Both can be circular (e.g., circles). Both can have the same size. A first distance defined between a center of inner fastener hole 122a and radial edge 120c can be equal to a second distance defined between a center of outer fastener hole 122b and radial edge 120c. According to various examples, the first distance is less than or equal to the second distance.

FIGS. 1 and 2 show inner fastener 200a moveably retained in inner fastener hole 122a and outer fastener 200b moveably retained in outer fastener hole 122b. Fasteners 200 can be moveably retained such that both are twistable/rotatable about their longitudinal axes. Fasteners 200 can be moveably retained such that both are capable of minor movement along their longitudinal axes. Fasteners 200 can be moveably retained such that neither can separate from plate assembly 100 without fastener 200 becoming physically deformed (e.g., compressed, unthreaded).

Figure 4:
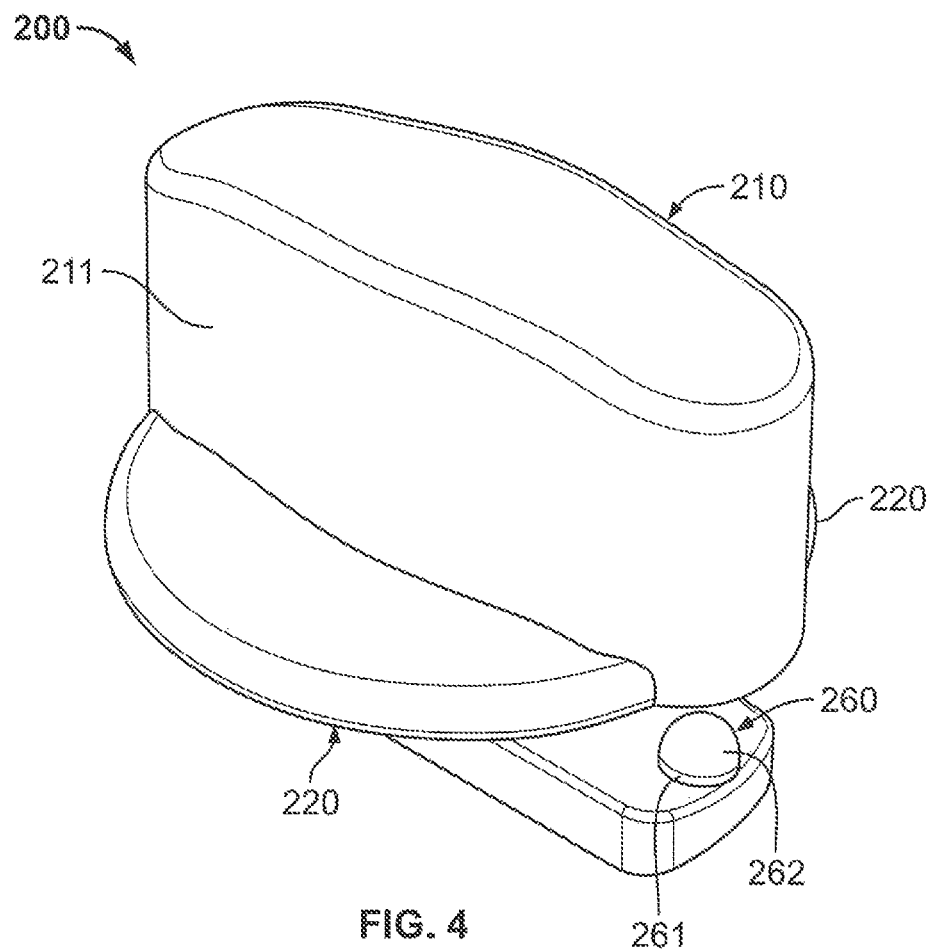
FIG. 4 is an isometric view of an example fastener for the example plate-fastener assembly.
Figure 5:
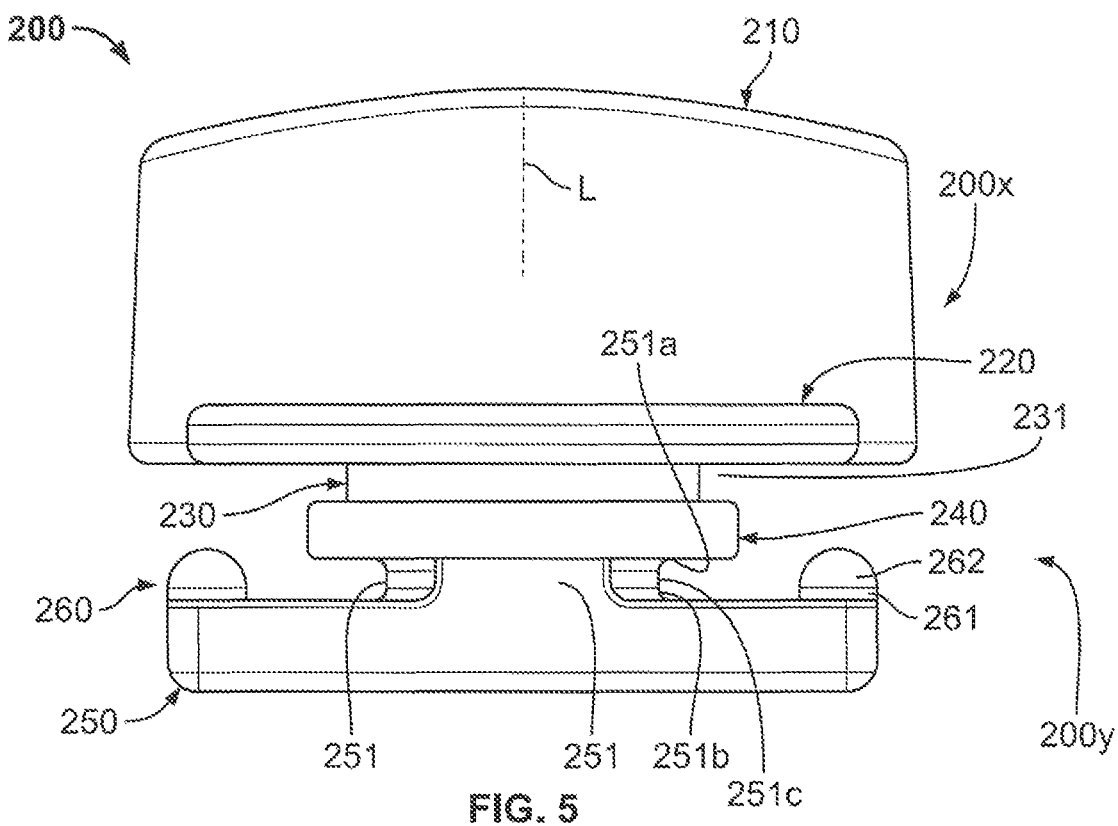
FIG. 5 is a side elevational view of the example fastener.
Figure 6:
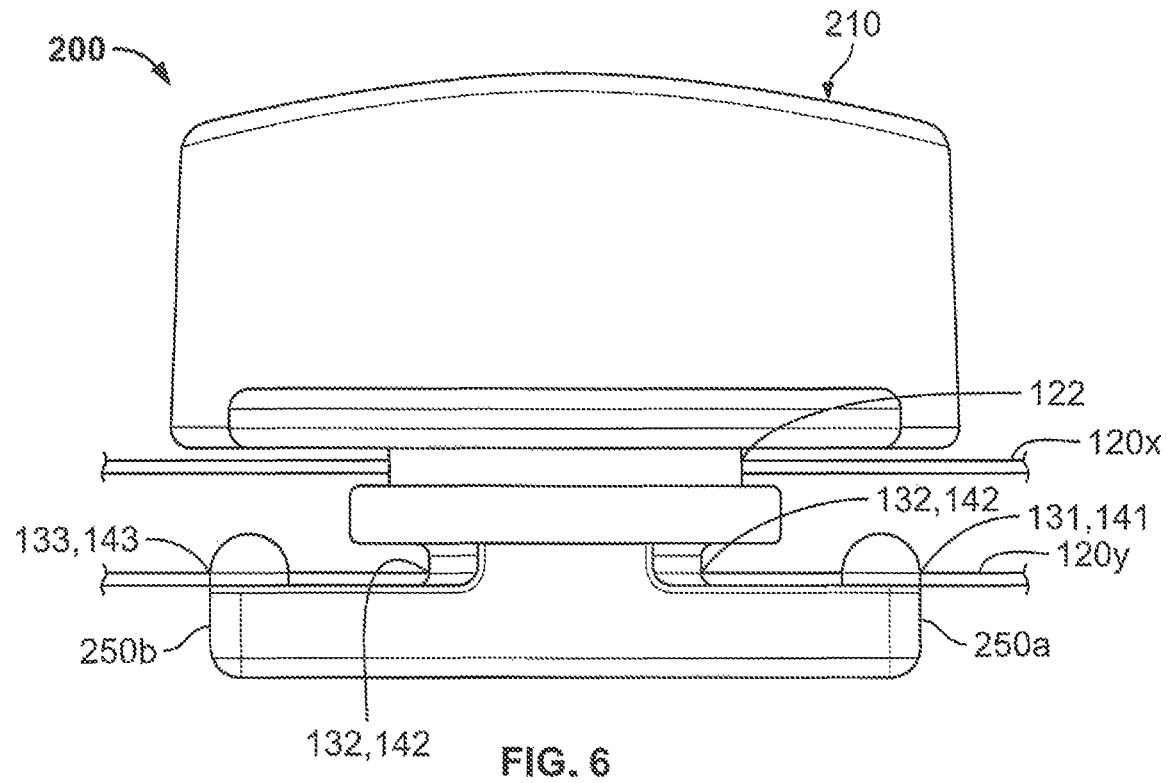
FIG. 6 is a side elevational view of the example fastener and a cross sectional schematic view of the example plate assembly when wrapped into a truncated cone.

FIG. 4 is an isometric view of fastener 200, FIG. 5 is a side elevational view of fastener 200. FIG. 6 is a view of fastener 200 retaining plate assembly 100 (shown in schematic cross section) in the truncated cone state. FIGS. 4-6 can thus apply to one or both of inner fastener 200a and outer fastener 200b. According to some examples, inner and outer fasteners 200a, 200b are identical.

Referring to FIGS. 4-6, fastener 200 can include a tab 210 (also called head, knob, or fin), one or more first transverse plates 220 (also called transverse shields, wings, or stops), a neck 230, one or more second transverse plates 240 (also called transverse shields or stops), a transverse catch 250 (also called a bridge or a foot), and one or more inserts 260 longitudinally extending from catch 250. FIG. 5 shows a reference longitudinal axis L of fastener 200.

Tab 210 can have the visually pleasing ornamental configuration shown in FIG. 4. Tab 210 can have nonlinear sides 211 to enhance a user's grip. Tab 210 can have any shape that enables gripping. First transverse plates 220 can outwardly protrude from tab 210. First transverse plates 220 can have any shape that exceeds a diameter of fastener hole 122. Neck 230 can be circular to enhance rotatability of fastener 200 with respect to arced plate 120. Similar to first transverse plates 220, second transverse plate 240 can have any shape that exceeds a diameter of fastener hole 122. According to some examples, second transverse plate 240 is dimensioned to fit through fastener hole 122 only when under radial compression. Upon fitting through, the radial compression can be released and transverse plate 240 returns to its uncompressed state, thus moveably securing fastener 200 in fastener hole 122.

Neck 230, first transverse plates 220, and second transverse plates 230 can define an annular slot 231 (also called groove). As shown in FIG. 6, arced plate first end 120x can protrude into annular slot 231, thus securing fastener 200 to arced plate first end 120x. Thus, the diameter of neck 230 can be less than or equal to the diameter of fastener hole 120. Absent deformation, first transverse plates 220 prevent separation between fastener 200 and arced plate 120 when fastener 200 is moved downwards. Absent deformation, second transverse plates 240 prevent separation between fastener 200 and arced plate 120 when fastener 200 is moved upwards.

If the thickness of arced plate 120 is less than the longitudinal length of neck 230, as shown in FIG. 6, then fastener 200 can be moved slightly upward with respect to arced plate 120 (until stopped by second transverse plates 240) and slightly downward with respect to arced plate 120 (until stopped by first transverse plates 220).

FIG. 6 shows an interference fit between fastener 200 and fastener hole 122, major aperture 132, 142, and minor apertures 133, 143. Such a fit is not necessary for all holes/apertures. According to some examples, fastener hole 122 has a non-interference fit, while one or both of major aperture 132, 142 and the two minor apertures 133, 143 have an interference fit. In FIG. 6, the major axis of major aperture 132, 142 extends into and out of the page.

Transverse catch 250 can be sized to fit through a major aperture 132, 142. According to some examples, transverse catch 250 can fit through major aperture 132, 142 when the longitudinal axis of fastener 200 is collinear with a central axis of second aperture 132, 142 (the central axis would extend into and out of the page in FIG. 3). According to other examples, transverse catch 250 is too large to fit through major aperture 132, 142 when the longitudinal axis of fastener 200 is collinear with the central axis of major aperture 132, 142 and thus fastener 200 must be tilted during attachment such that one end 250a, 250b of transverse catch 250 fits through major aperture 132, 142 before the other end 250b, 250a.

Inserts 260 can longitudinally extend from transverse catch 250 and include a cylindrical portion 261 plus a domed portion 262. Cylindrical portion 261 can have a constant circular radius. Domed portion 262 can have a varying circular radius. Inserts 260 are configured to occupy first minor apertures 131 on opposing sides of a first major aperture 132 (when fastener 200 is attached via first arced aperture array 130) or opposing second minor apertures 141 on opposing sides of a second major aperture 142 (when fastener 200 is attached via second arced aperture array 140).

To enhance attachment via an interference fit, cylindrical portion 261 can have a diameter exceeding first minor aperture 131 (when fastener 200 is attached via first arced aperture array 130) and a diameter exceeding second minor aperture 141 (when fastener 200 is attached via second arced aperture array 140).

According to some examples, and as shown in FIGS. 5 and 6, transverse catch 250 can include a plurality of retaining faces 251 configured to contact the flat surfaces 132a, 142a (also called major aperture faces) defining major aperture 132, 142. The contact can be an interference contact where one or both of retaining surfaces 251 bear against flat surfaces 132, 142. Such a configuration can discourage fastener 200 from rotating with respect to arced plate 120.

According to some examples, the distance between opposing retaining faces 251 is such that catch 250 is configured to simultaneously bear on both flat surfaces 132a, 142a (i.e., both flat surfaces 132a if fastener 200 is disposed in a first major aperture 132 and both flat surfaces 142a if fastener 200 is disposed in a second major aperture 142) defining a major aperture 132, 142. As shown in FIG. 6, the retaining faces 251 of transverse catch 250 are coplanar with both inserts 260 (e.g., a single reference plane can intersect both flat surfaces 251 and both inserts 260 (e.g., at both cylinder portions 261).

Fastener 200 can include a total of four retaining faces 251. As shown in FIGS. 5 and 6, each retaining face 251 can be flat in a circumferential direction and arced in a longitudinal direction such that a top 251a and a bottom 251b can outwardly protrude more than a middle 251c. According to some examples, a dimension between opposing middles 251c is less than a dimension between opposing aperture flat surfaces 132a, 142a while a dimension between opposing tops 251a and a dimension between opposing bottoms 251b is greater than a dimension between opposing flat surfaces 132a, 142. Such a configuration can further discourage fastener 200 from moving with respect to a major aperture 132, 142.

Fastener 200 can be a single unitary and integral component. Alternatively, fastener 200 can be assembled from diverse components. According to some examples, a tab 210 and plates 220 begin as a first unitary and integral component 200x, while neck 230, second transverse plates 240, transverse catch 250, and inserts 260 begin as a second unitary and integral component 200y. The user can stick neck 230 through an aperture hole 122, then thread the tab 210 onto neck 230. Upon threading, fastener 200 is secured to arced plate 120 and cannot be removed unless arced plate 120 is broken or fastener 200 is deformed (e.g., unthreaded, compressed).

To enable threading, an upper portion (not shown) of neck 230 can include threads and a cylindrical recess defined in the bottom of (not shown) of tab 210 can include counter-threads. Alternatively, one of first component 200x and second component 200y can define a longitudinally extending and threaded bore while the other of first component 200x and second component 200y can define a longitudinally extending and threaded blind bore. After sticking neck 230 through fastener hole 122, the user can insert a screw into both bores, then tighten the screw to bond the components 200x, 200y together.

Inner arced aperture array 130 can include a plurality of first major apertures 132 alternating with a plurality of first minor apertures 131. Each first major aperture 132 can be oval-shaped with two opposing flat sides 132a and two opposing arced sides (not labeled). Each minor aperture 131 can be circular. As shown in FIG. 3, each first major aperture 132 is disposed between two first minor apertures 131. Therefore, every minor aperture 131 (except for the two ending minor first apertures 131) can occupied in concert with either of its neighboring first apertures 132. For example, minor aperture 131x can be occupied in concert with major aperture 132x and minor aperture 131y. Alternatively, minor aperture 131 can be occupied in concert with major aperture 132y and minor aperture 131z.

To form inner arced aperture array 130, the center of each first aperture 131, 132 can fall on (e.g., approximately fall on) a reference circumference disposed about center point C. As such, the center of each first aperture 131, 132 can be the same first distance from inner edge 120b and the center of each first aperture 131, 132 can be the same second distance from outer edge 120a. Such an arrangement generates a pleasing visual effect.

Outer arced aperture array 140 can include a plurality of second major aperture 142 and a plurality of second minor apertures 141. Except for the ending second major apertures 142, directly adjacent second major apertures 142 can be separated by two second minor apertures 141. According to some examples, fastener 200 and arced plate 120 are configured such that inserts 260 cannot occupy directly adjacent and consecutive second minor apertures 141 (e.g., inserts 260 cannot simultaneously occupy second minor apertures 141x and 141y, but could simultaneously occupy second minor apertures 141x and 141z).

To form outer arced aperture array 140, the center of each second aperture 141, 142 can fall on (e.g., approximately fall on) a reference circumference disposed about center point C. As such, the center of each second aperture 141, 142 can be the same first distance from inner edge 120b and the center of each second aperture 141, 142 can be the same second distance from outer edge 120a. Such an arrangement generates a pleasing visual effect.

As shown in FIG. 3, the inner and outer arced aperture arrays 130, 140 can include the same number of major apertures 132, 142. Each first major aperture 132 can be co-radial (e.g., approximately co-radial) with one second major aperture 142. Such an arrangement is visually pleasing.

FIG. 6 shows fastener 200 bonding opposing arced plate ends 120x, 120y together to hold plate assembly 100 in the truncated cone state. Initially, the user inserted neck 230 through a single fastener hole 122. Once inserted, the user threaded the first and second components 200x, 200y together such that arced plate 120 occupied at least a portion of annular slot 231. The user wrapped plate assembly 100 about an animal's neck and head.

The user fit transverse catch 250 through a first or second major aperture 132, 142 (a first major aperture 132 if fastener 200 is an inner fastener 200a and a second major aperture 142 if fastener is an outer fastener 200b). Once through, the user grabbed tab 210 to rotate fastener 200 ninety degrees such that opposing fastener flat surfaces 251 faced opposing aperture flat surfaces 132a, 142a. The user protruded inserts 260 through the two minor apertures 131, 141 on opposing sides of the major aperture 132, 142. The user repeated the same process for the other fastener 200 with respect to the other aperture array 130, 140.

For a visually pleasing effect, the first minor apertures 131 and the second minor apertures 141 can be identical and the first major apertures 132 and the second major apertures 142 can be identical. To discourage mistakes, the first minor apertures 131 and cross sections of the inserts 260 of the inner fastener 200a can have first shapes while the second minor apertures 141 and cross sections of the inserts of the outer fastener 200b can have second shapes.

The first shapes can be circles and the second shapes can be non-circles (e.g., rectangles). The first and second shapes can be rectangles (in this case, the domed portion 262 of each insert 260 could be a pyramid (e.g., a truncated pyramid) and the cylindrical portion 261 of each insert 260 could be a box (e.g., a box with a square cross section). The first and second shapes can be the same with different sizes (e.g., larger circles for the first shapes and smaller circles for the second shapes).

FIG. 6 shows fastener 200 joining opposing ends 120x, 120y of arced plate 120. Fastener 200 can be applied to join other objects. According to some examples, opposing ends 120x, 120y can represent distinct plates. One of the plates can define a fastener hole 122. The other of the plates can define aperture series 130, 140 (e.g., at least one major aperture and two opposing minor apertures). Multiple fasteners 200 can join the distinct plates together in the manner previously discussed (e.g., each fastener 200 can extend through one fastener hole, one major aperture, and two minor apertures).

We claim:

1. A veterinary collar plate-fastener assembly comprising:
    (a) an arced plate comprising an inner surface and an outer surface, the arced plate defining a first arced aperture array, a second arced aperture array, a first fastener hole, and a second fastener hole;
        the first arced aperture array comprising a plurality of first minor apertures and a plurality of first major apertures;
        the second arced aperture array comprising a plurality of second minor apertures and a plurality of second major apertures;
    (b) a first fastener and a second fastener, each of the fasteners comprising a tab, a plurality of transverse plates defining an annular slot, a transverse catch, and two inserts extending normal to the transverse catch;
        the first fastener being disposed in the first fastener hole such that the arced plate occupies the first fastener annular slot and thereby retains the first fastener, the second fastener being disposed in the second fastener hole such that the arced plate occupies the second fastener annular slot and thereby retains the second fastener;
        wherein a shape of the first fastener hole is different from a shape of each aperture of the plurality of first major apertures;
        wherein the first fastener and the first arced aperture array are formed such that the two first fastener inserts can simultaneously occupy any two consecutive first minor apertures; and
        the second fastener and the second arced aperture array being formed such that the two second fastener inserts cannot simultaneously occupy any two consecutive second minor apertures positioned between two major apertures.

2. The assembly of claim 1, wherein each first minor aperture has the same first shape and each second minor aperture has the same second shape.

3. The assembly of claim 2, wherein the second arced aperture array comprises more minor apertures than the first arced aperture array, the first and second shapes being equal.

4. The assembly of claim 1, wherein each of the fasteners comprises a neck, a portion of each neck being coplanar with the arced plate.

5. The assembly of claim 4, wherein each plurality of transverse plates comprises a first transverse plate and a second transverse plate, the first transverse plate being separated from the second transverse plate by the neck of each respective fastener.

6. The assembly of claim 5, wherein the arced plate moveably retains the first and second fasteners such that the first fastener and the second fastener are each independently rotatable with respect to the arced plate.

7. The assembly of claim 6, wherein the first fastener transverse catch comprises diametrically opposing retaining faces which are simultaneously coplanar with the inserts.

8. The assembly of claim 7, wherein each first major aperture is oval-shaped and defined by opposing aperture faces of the arced plate.

9. The assembly of claim 7, wherein the diametrically opposing retaining faces are arced in a longitudinal direction.

10. The assembly of claim 1, wherein the first fastener inserts each comprise a major portion and a minor portion, the major portions having a constant cross section, the minor portions having a varying cross section, the major portions being disposed closer to the transverse catch than the minor portions.

11. The assembly of claim 1, wherein the arced plate is wrapped into a truncated cone.

12. The assembly of claim 11, wherein the first and second fasteners retain the arced plate in the truncated cone state.

13. The assembly of claim 12, wherein the two first fastener inserts occupy two of the first minor apertures and the transverse catch occupies one of the first major apertures.

14. The assembly of claim 13, wherein (a) the first arced aperture array consists of the first minor apertures and the first major apertures and (b) the second arced aperture array consist of the second minor apertures and the second major apertures.

15. The assembly of claim 14, wherein a total number of the first major apertures is equal to a total number of the second major apertures.

16. A method of using the assembly of claim 1, comprising disposing the assembly about an animal.

17. The assembly of claim 1, wherein the shape of the first fastener hole is circular and the shape of each aperture of the plurality of first major apertures is elongated to correspond to a shape of the transverse catch.

18. The assembly of claim 1, wherein one of the transverse plates of the plurality of transverse plates is configured to operate in a compressed state to allow the transverse plate to fit through the first fastener hole or the second fastener hole and in an uncompressed state in which the transverse plate retains the fastener in the first fastener hole or the second fastener hole.

19. A veterinary collar plate-fastener assembly comprising:
(a) a first plate defining a first arced aperture array and a second arced aperture array; the first arced aperture array comprising a plurality of first minor apertures and a plurality of first major apertures; the second arced aperture array comprising a plurality of second minor apertures and a plurality of second major apertures;
(b) a second plate defining a first fastener hole and a second fastener hole;
(c) a first fastener and a second fastener, each of the fasteners comprising a tab, a plurality of transverse plates defining an annular slot, a transverse catch, and two inserts extending normal to the transverse catch, wherein one of the transverse plates of the plurality of transverse plates is configured to operate in a compressed state to allow the transverse plate to fit through the first fastener hole or the second hole and in an uncompressed state in which the transverse plate retains the fastener in the first fastener hole or the second fastener hole;
the first fastener being disposed in the first fastener hole such that the second plate occupies the first fastener annular slot and thereby retains the first fastener, the second fastener being disposed in the second fastener hole such that the second plate occupies the second fastener annular slot and thereby retains the second fastener;
the first and second fasteners binding the first plate and the second plate together;
wherein the first fastener and the first arced aperture array are formed such that the two first fastener inserts can simultaneously occupy any two consecutive first minor apertures; and
the second fastener and the second arced aperture array being formed such that the two second fastener inserts cannot simultaneously occupy any two consecutive second minor apertures positioned between two major apertures.

20. The assembly of claim 19, wherein a total number of the first major apertures is equal to a total number of the second major apertures.

21. A veterinary collar plate-fastener assembly comprising:
(a) an arced plate comprising an inner surface and an outer surface, the arced plate defining a first arced aperture array, a second arced aperture array, a first circular fastener hole, and a second fastener hole;
the first arced aperture array comprising a plurality of first minor apertures and a plurality of first major apertures;
the second arced aperture array comprising a plurality of second minor apertures and a plurality of second major apertures;
(b) a first fastener and a second fastener, each of the fasteners comprising a tab, a plurality of transverse plates defining an annular slot, a transverse catch, and two inserts extending normal to the transverse catch, the transverse catch having an outer profile that corresponds to a shape of each major aperture in the plurality of first major apertures;
the first fastener being disposed in the first fastener hole such that the arced plate occupies the first fastener annular slot and thereby retains the first fastener, the second fastener being disposed in the second fastener hole such that the arced plate occupies the second fastener annular slot and thereby retains the second fastener;
wherein the first fastener and the first arced aperture array are formed such that the two first fastener inserts can simultaneously occupy any two consecutive first minor apertures;
the second fastener and the second arced aperture array being formed such that the two second fastener inserts cannot simultaneously occupy any two consecutive second minor apertures, each first minor aperture having a first shape and each second minor aperture having a second shape. the second arced aperture array comprising more minor apertures than the first arced aperture array, the first and second shapes being equal, each of the fasteners comprising a neck, a portion of each neck being coplanar with the arced plate;
each plurality of transverse plates comprises a first transverse plate and a second transverse plate, the first transverse plate being separated from the second transverse plate by the neck of each respective fastener; and
the arced plate being wrapped into a truncated cone.

* * * * *